March 23, 1937. D. W. UBER 2,074,524
MEASURING DEVICE
Filed April 16, 1936
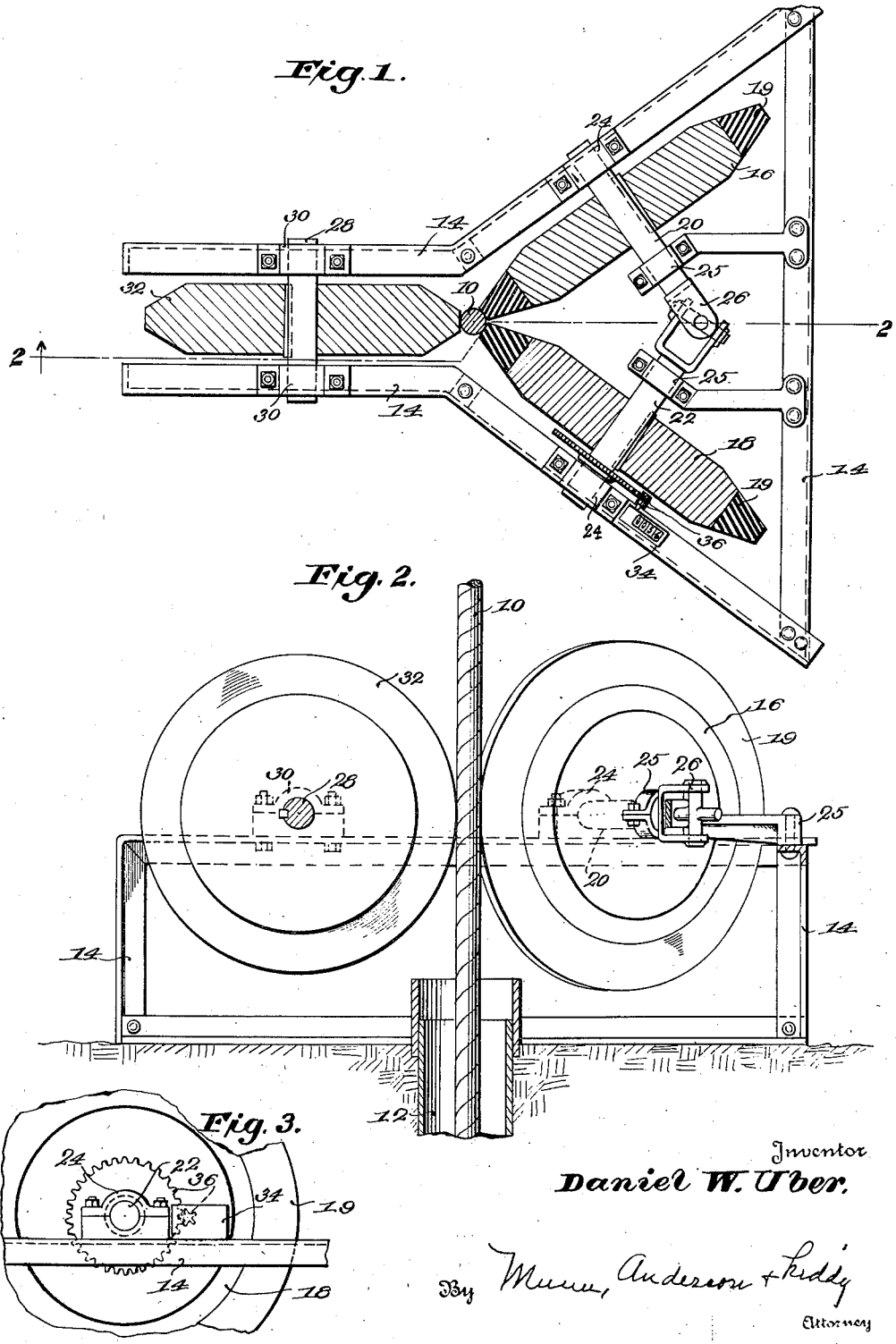

Patented Mar. 23, 1937

2,074,524

UNITED STATES PATENT OFFICE 2,074,524

MEASURING DEVICE

Daniel W. Uber, Kane, Pa.

Application April 16, 1936, Serial No. 74,770

2 Claims. (Cl. 33—134)

The improved measuring device comprising the present invention is primarily adapted for use in determining the depth of a well by measuring the cable thereof as it is lowered into the well, thus eliminating the use of a measuring line. The principles of the invention however are applicable to other uses and the device may, with or without modification, be employed for measuring the length of a line regardless of its nature or of the use to which it may be put.

The present invention is designed as an improvement over the apparatuses shown and described in United States Patent No. 1,228,991, issued to me June 5, 1917, and has for its principal object a general simplification of the structures disclosed in the said patent, together with a material increase in the efficiency thereof.

More specifically, it is an object of the present invention to provide a measuring instrument in which the tendency for slippage of the cable through the same is reduced to a minimum, thus increasing the accuracy of the device.

Convenience of arrangement of parts, durability, comparative strength and rigidity of construction, together with a material elimination of weight as made possible by the elimination of intermeshing gears, are further desirable features that have been borne in mind in the production and development of the present invention.

Other objects and advantages of the invention not at this time more particularly enumerated will become more readily apparent as the nature of the invention is better understood, and the same consists in the novel construction, combination and arrangement of parts shown in the accompanying single sheet of drawings, in which:

Figure 1 is a horizontal sectional view taken through the assembled device showing the same applied to a cable, Figure 2 is a sectional view taken substantially along the line 2—2 of Figure 1, and Figure 3 is a detailed side elevation of a counter or indicia driving mechanism employed in connection with the present invention.

In all of the above described views, like characters of reference are employed to designate like parts throughout.

The assembled device is shown in measuring position on a cable 10 of a well 12, and comprises a supporting frame designated in its entirety at 14 adapted to be positioned over the well with the cable passing downwardly through the frame and associated with a measuring mechanism carried by the latter.

The measuring mechanism comprises a pair of rollers or wheels 16 and 18, respectively, the axes of rotation of which occupy a common horizontal plane but which are inclined with respect to each other in such a manner that the vertically extending portion of the well cable 10 may be brought to bear tangentially upon the peripheries of both rollers 16 and 18 to impart rotational movement to the rollers by traction as clearly shown in Figure 1. The rollers 16 and 18 are preferably identical in construction, each having a measured circumference which may be twenty-four inches or for convenience some other multiple of twelve. The peripheral surfaces of the rollers 16 and 18 are preferably flat to insure equal measured traction on the cable 10. In order to attain more perfect traction the rollers may if desired be provided with rubber tires 19. The rollers 16 and 18 are mounted upon shafts 20 and 22 respectively to which they are keyed and the outer ends of these shafts are journaled in bearings 24 carried by diverging portions of the frame 14. The inner adjacent ends of the shafts 20 and 22 are supported and journaled in similar bearings 25 carried by the frame 14 and are connected together by a flexible coupling or universal joint 26. Thus the rollers 16 and 18 are compelled to rotate in unison at the same rate of speed, deriving their rotational movement by tractional engagement of their peripheries with the surface of the cable 10 as it passes downwardly into the well 12. It is to be borne in mind that any suitable mechanical expedient may be employed for insuring synchronous rotation of the measuring rollers 16 and 18. However, the specific use of a flexible coupling or universal joint contributes to the lightness and compactness of the measuring device by the elimination of heavy gearing, while at the same time economy of manufacture and comparative ease of assembly together with facility of transportation of the device is attained.

Keyed or otherwise secured to a shaft 28 suitably journaled as at 30 in the frame 14 is a pressure roller 32 similar in its design to the rollers 16 and 18. The axis of rotation of this roller occupies a common plane with the axes of rotation of the rollers 16 and 18. The peripheral edge of the pressure roller 32 is designed to bear against the vertically extending portion of the cable 10 and urge the same against the peripheral edges of the rollers 16 and 18. Toward this end the pressure roller 32 is so positioned with respect to the mutually inclined rollers 16 and 18 that the force applied by it to the cable 10 is equal to the resultant forces or vector of the pressure applied to this cable in the opposite direction by the combined action of the rollers 16 and 18. Since the axes of rotation of the measuring rollers 16 and 18, together with the axis of rotation of the pressure roller 32, all occupy a common horizontal plane, the points of contact between the peripheral edges of the rollers and the surface of the cable 10 at any particular instant occupy a common horizontal plane on the periphery of the cable and thus the cable is firmly engaged and compressed by the rollers at three adjacent points and any tendency toward slippage is prevented.

An indicating device or counter 34 is positioned on the frame 14 and is designed to be actuated by rotational movement derived from the shafts 20 and 22. In this instance the indicating device 34 is shown as being driven directly from the shaft 22 through a train of gears 36 (Fig. 3). The indicating device 34 records either the number of linear feet traveled by the cable 10 in its descent into the well or the number of revolutions of the measuring rollers 16 and 18 from which, record of the linear travel of the cable may be calculated.

Thus, when the length of cable is lowered into the well through the measuring device in the manner described, as the tool strikes the bottom of the well, the indicating instrumentality 34 will stand as a record of the consequent depth of the well.

It is to be understood that various changes in the details of construction may be resorted to without departing from the spirit of the invention. For example, while the indicating device has been shown as depending for its operation upon a train of gears actuated by the shaft 22, other actuating means operable either from the shaft 20 or the shaft 22 may be employed. Similarly the dimensions of the measuring rollers, in so far as they are maintained identical in circumference are immaterial. Only in so far as the invention has particularly been pointed out in the accompanying claims is the same to be limited.

I claim:

1. A measuring device for ascertaining the length of cables or the like comprising a frame, a pair of measuring rollers mounted upon shafts journaled in said frame the longitudinal axes of which occupy a common plane and are inclined at an acute angle towards each other, the adjacent ends of said shafts being connected together by a flexible coupling whereby said rollers are compelled to rotate in unison, said rollers being adapted to derive rotational movement by traction of their peripheries with the surface of said cable, a pressure roller for maintaining said cable in tractional contact with the peripheries of said measuring rollers, and an indicating device operable from one of said shafts.

2. A portable measuring device for ascertaining the depth of wells or the like by measuring the length of the cable thereof comprising a supporting frame adapted to be arranged above the well, a pair of measuring rollers mounted upon shafts whose longitudinal axes occupy a common horizontal plane and are inclined at an acute angle towards each other, the outer ends of said shafts being journaled in the frame, the inner adjacent ends of said shafts being connected together by a flexible coupling whereby said rollers are compelled to rotate in unison, said rollers being adapted to derive rotational movement by traction of their peripheries with the surface of said cable, a pressure roller mounted for rotation in said frame and adapted to have its periphery bear against the surface of said cable to urge the same against the peripheries of said measuring rollers, and an indicating device connected to one of said shafts.

DANIEL W. UBER.